United States Patent [19]
Kawai

[11] Patent Number: 5,407,651
[45] Date of Patent: Apr. 18, 1995

[54] CATALYST FOR AND METHOD OF PURIFYING EXHAUST GAS

[75] Inventor: Yoshiaki Kawai, Shinnanyo, Japan

[73] Assignee: Tosoh Corporation, Shinnanyo, Japan

[21] Appl. No.: 834,193

[22] Filed: Feb. 12, 1992

[30] Foreign Application Priority Data

| Feb. 15, 1991 | [JP] | Japan | 3-042310 |
| Feb. 15, 1991 | [JP] | Japan | 3-042311 |
| Feb. 15, 1991 | [JP] | Japan | 3-042312 |

[51] Int. Cl.$^6$ ............................................. B01D 53/36
[52] U.S. Cl. .................. 423/213.2; 423/213.5; 423/239.2; 423/245.3; 423/247; 423/212
[58] Field of Search ............ 423/213.2, 213.5, 212 C, 423/212 R, 239.2, 245.3, 247

[56] References Cited

U.S. PATENT DOCUMENTS

| 3,779,014 | 12/1973 | Nohira et al. | 60/286 |
| 3,839,225 | 10/1974 | Acres | 252/432 |
| 3,839,545 | 10/1974 | Schwab et al. | 423/437 |
| 5,041,272 | 8/1991 | Tamura et al. | 423/239 |
| 5,149,512 | 9/1992 | Li et al. | 423/239 |
| 5,260,043 | 11/1993 | Li et al. | 423/239.2 |

FOREIGN PATENT DOCUMENTS

| 0188138 | 7/1986 | European Pat. Off. . |
| 0462598 | 12/1991 | European Pat. Off. . |
| 0491359 | 6/1992 | European Pat. Off. . |
| 0499286 | 8/1992 | European Pat. Off. ......... 423/239.2 |
| 1442901 | 5/1969 | Germany . |
| 62-106826 | 5/1987 | Japan ................. 423/213.2 |
| 4260441 | 9/1992 | Japan ................. 423/245.3 |
| 4363144 | 12/1992 | Japan ................. 423/245.3 |
| 5-76751 | 3/1993 | Japan ................. 423/239.2 |
| 983372 | 2/1965 | United Kingdom ............. 423/245.3 |

OTHER PUBLICATIONS

Patents Abstracts of Japan, vol. 14, No. 544, (C-784)(4487), Dec. 4, 1990, & JP-A-2 233 145, Shinichi Takeshima, "Catalyst for Purifying Exhaust Gas".

Primary Examiner—Gary P. Straub
Assistant Examiner—Timothy C. Vanoy
Attorney, Agent, or Firm—Oblon, Spivak, McClelland, Maier & Neustadt

[57] ABSTRACT

A catalyst for and method of purifying an exhaust gas to thereby remove nitrogen oxides, carbon monoxide and hydrocarbons from an oxygen rich exhaust gas containing same, comprising a zeolite having (i) manganese, (ii) cobalt and palladium, or (iii) cobalt and silver contained therein.

13 Claims, No Drawings

CATALYST FOR AND METHOD OF PURIFYING EXHAUST GAS

BACKGROUND OF THE INVENTION

1. Field of the Invention

The present invention relates to a catalyst for and method of purifying an exhaust gas to thereby remove nitrogen oxides, carbon monoxide and hydrocarbons contained in an exhaust gas discharged, for example, from the internal combustion engines of automobiles, gas engines in cogeneration system and the like, more particularly, it relates to a catalyst for and method of removing nitrogen oxides contained in an oxygen rich exhaust gas.

The term "oxygen rich exhaust gas" used herein is intended to mean an exhaust gas containing oxygen in an amount exceeding the amount of oxygen necessary for completely oxidizing reducing component such as carbon monoxide, hydrocarbons contained in the exhaust gas. Specific examples of such an exhaust gas include exhaust gases discharged, for example, from internal combustion engines of automobiles reducing component such as, particularly exhaust gases produced at a high air/fuel ratio, excess air ratio respectively. (i.e., in the lean burn region).

2. Description of the Related Art

The worsening environmental problems have made it important to increase the removal of nitrogen oxides, carbon monoxide, hydrocarbons, etc., emitted from various sources. Namely, nitrogen oxides are discharged in a large amount from various moving sources including internal combustion engines, such as gasoline engines of automobiles, and from fixed sources including boilers in plants and gas engines and gas turbines in cogeneration systems, etc., and thus the purification of such exhaust gases is urgently required, as it is a serious social problem.

Currently, a three-way catalyst comprising Pt, Rh, Pd, etc., supported on a carrier material is used as a catalyst for purifying an exhaust gas discharged from internal combustion engines, but since the three-way catalyst cannot remove nitrogen oxides contained in an oxygen-rich exhaust gas, it is used in combination with a system for controlling the air to fuel ratio of an engine (i.e., "air-fuel ratio").

A lean combustion system has been developed, to attempt a lowering of the fuel consumption and a reduction in the amount of carbon dioxide exhaust gas emissions, but an exhaust gas from this lean combustion system contains an excess amount of oxygen, and thus the nitrogen oxides cannot be removed by the above-mentioned three-way catalyst.

Nitrogen oxides contained in an oxygen rich exhaust gas are removed by selective catalytic reduction method, wherein ammonia is used. The practical application of this method, however, is limited due to the necessity of increasing the size of the equipment and the hazardous nature of ammonia.

Recently, a zeolite catalyst capable of removing nitrogen oxides contained in an oxygen rich exhaust gas without the addition of a special reducing agent such as ammonia has been proposed. For example, Japanese Unexamined Patent Publication (Kokai) Nos. 63-283727 and 1-130735 disclose that a zeolite catalyst ion exchanged with a transition metal can remove nitrogen oxides even in an oxygen rich exhaust gas, through the utilization of minor amounts of unburnt hydrocarbons contained therein as a reducing agent.

The conventional zeolite catalysts proposed in Japanese Unexamined Patent Publication (Kokai) Nos. 63-283727 and 1-130735 have not yet been put to practical use.

Further, in the case of internal combustion engines such as gas engines and gas turbines wherein a gaseous fuel is used, the hydrocarbons contained, in a minor amount, in an exhaust gas have mainly one carbon atom, and therefore, the ability of the conventional zeolite catalysts to remove nitrogen oxides contained in this type of exhaust gas is particularly low.

SUMMARY OF THE INVENTION

Accordingly, the objects of the present invention are to eliminate the above-mentioned disadvantages of the prior art and to provide a catalyst for purifying an exhaust gas, by which nitrogen oxides, carbon monoxide and hydrocarbons are efficiently removed from an oxygen rich exhaust gas containing nitrogen oxides, carbon monoxide and hydrocarbons.

Another object of the present invention is to provide a method of purifying an exhaust gas, through the use of a catalyst of the type mentioned above.

Other objects and advantages of the present invention will be apparent from the following description.

In accordance with the present invention, there is provided a catalyst for purifying an exhaust gas to thereby remove nitrogen oxides, carbon monoxide and hydrocarbons from an oxygen rich exhaust gas containing the same, comprising a zeolite having (i) manganese, (ii) cobalt and palladium or (iii) cobalt and silver, contained therein.

In accordance with the present invention, there is also provided a method of purifying an oxygen rich exhaust gas, by removing nitrogen oxides, carbon monoxide, and hydrocarbons from the oxygen rich exhaust gas containing the same, comprising the step of bringing a catalyst into contact with the exhaust gas, said catalyst comprising a zeolite having (i) manganese, (ii) cobalt and palladium or (iii) cobalt and silver contained therein.

DESCRIPTION OF THE PREFERRED EMBODIMENTS

The present inventors have made extensive and intensive studies of the above-mentioned problems, and as a result, have found that a catalyst comprising a zeolite and (i) manganese, (ii) a combination of cobalt with palladium or (iii) a combination of cobalt with silver is capable of efficiently purifying nitrogen oxides, carbon monoxide and hydrocarbons from an oxygen rich exhaust gas, and that the conversion of nitrogen oxides can be further enhanced through the use of such a catalyst and the addition of a hydrocarbon to the exhaust gas, and thus completed the present invention.

The present invention will now be described in more detail.

The zeolite usable in the present invention is a crystalline aluminosilicate generally having the following composition:

$$xM_{2/n}O \cdot Al_2O_3 \cdot ySiO_2 \cdot zH_2O \qquad (I)$$

wherein n is a valency of the cation M, x is 0.8 to 1.2, y is 2 or more and z is 0 (zero) or more, and includes many naturally occurring zeolites and synthetic zeolites known in the art. Although there is no particular limitation on the type of zeolite used in the present invention, those having a silica/alumina mole ratio of 10 or more are preferable; representative examples of the zeolite include ferrierite, Y, mordenite, ZSM-5 and ZSM-11, and among them, ZSM-5 is most preferable. These zeolites may be used as such or after an ion exchange with $NH_4Cl$, $NH_4NO_3$, $(NH_4)_2SO_4$, etc., to form an $NH_4$ or H type zeolite, and further, may contain cations such as an alkali metal or an alkaline earth metal.

The catalyst for purifying an exhaust gas according to the present invention is characterized by containing (i) manganese, (ii) a combination of cobalt with palladium or (iii) a combination of cobalt with silver. There is no particular limitation on the method of incorporating manganese, cobalt, palladium or silver into the zeolite, and such an incorporation may be conducted by a conventional ion exchange method or impregnation supporting method, etc. The ion exchange method is preferred for incorporating cobalt, and the impregnation supporting method is preferred for incorporating palladium or silver.

There is no particular limitation on the method of carrying out the ion exchange. For example, the ion exchange may be carried out by adding a zeolite to a solution containing the above-mentioned metal ion, followed by stirring the mixture at 20° to 100° C. for several hours. Examples of the metal salt used include acetate, nitrate, oxalate and chloride.

The method of carrying out the impregnation support also is not particularly limited. For example, the impregnation support may be carried out by immersing a zeolite in a solution containing the above-mentioned metal, followed by heating the mixture while stirring, to remove water. Examples of the metal salt used include chloride and amine complex.

Although there is no particular limitation on the content of the above-mentioned metals, the manganese content is preferably about 0.2 to 2.5, more preferably 0.25 to 2.0, in terms of the $MnO/Al_2O_3$ mole ratio. When cobalt and palladium are incorporated, the cobalt content is preferably 0.2 to 2.5, more preferably 0.25 to 2.0, in terms of the $CoO/Al_2O_3$ mole ratio and the palladium content is preferably 0.01 to 1.0, more preferably 0.06 to 0.8, in terms of the $PdO/Al_2O_3$ mole ratio and 0.2 to 3.5, more preferably 0.25 to 2.8, in terms of the $(PdO+CoO)/Al_2O_3$ mole ratio. When the cobalt and silver are incorporated, the cobalt content is preferably 0.5 to 1.5, more preferably 0.6 to 1.45, in terms of the $CoO/Al_2O_3$ mole ratio, and the silver content is preferably 0.01 to 5.0, more preferably 0.05 to 4.0, in terms of the $Ag_2O/Al_2O_3$ mole ratio and 0.5 to 6.5, more preferably 0.6 to 5.5, in terms of the $(Ag_2O+CoO)/Al_2O_3$ mole ratio. When the metal contents are lower than the above-mentioned respective ranges, a satisfactory activity cannot be obtained. When the metal contents are higher than the above-mentioned respective ranges, however, a greater effect will not be attained merely by excessive amounts of added metals.

The sample containing the above-mentioned metal may be used as a catalyst after a pretreatment such as drying, calcination or the like.

There is no particular limitation on the configuration, structure, etc., of the catalyst for purifying an exhaust gas according to the present invention, and the catalyst for purifying an exhaust gas may be in the form of, for example, a pellet or a honeycomb. The introduction of the metal element may be carried out after molding.

The catalyst for purifying an exhaust gas according to the present invention may be used after being mixed with an alumina sol, a silica sol or a binder such as a clay mineral and then molded. Alternatively, the catalyst may be used after water is added to the catalyst to prepare a slurry, which is then coated on a honeycomb-structured base material made of alumina, magnesia, cordierite or the like.

The exhaust gas to be purified by the catalyst of the present invention is an oxygen rich exhaust gas containing nitrogen oxides, carbon monoxide and hydrocarbons. The term "oxygen rich exhaust gas" used herein is intended to mean an exhaust gas containing oxygen in an amount exceeding the amount of oxygen necessary for completely oxidizing reducing components such as carbon monoxide and hydrocarbons, etc., contained in the exhaust gas. Although there is no particular limitation on the hydrocarbons contained in the exhaust gas, the catalyst of the present invention can efficiently purify an exhaust gas even when hydrocarbons having one carbon atoms are contained in the exhaust gas as a main component. In general, most of the hydrocarbons contained in an exhaust gas discharged from an engine wherein a liquid fuel is used, such as automobiles, have 2 or more carbon atoms, but the hydrocarbons contained in an exhaust gas discharged from an engine wherein a gas fuel is used, such as gas engines, are mainly a hydrocarbon having one carbon atom. In general, the reactivity of the hydrocarbon increases with an increase of the number of carbon atoms, and when the number of carbon atoms is 1, the reactivity is particularly low. The expression "exhaust gas wherein the hydrocarbons contained in the exhaust gas are mainly a hydrocarbon having 1 carbon atom" is intended to mean an exhaust gas such that 80% or more of the hydrocarbons contained in the exhaust gas are hydrocarbons having 1 carbon atom. Examples of such an exhaust gas include exhaust gases discharged, for example, from gas engines in a lean combustion system wherein a city gas is used as the fuel.

There is no particular limitation on the hydrocarbon added to the exhaust gas, and the catalyst of the present invention can efficiently purify an exhaust gas even when the hydrocarbon is methane or a gaseous hydrocarbon mixture composed mainly of methane. The "gaseous hydrocarbon mixture, composed mainly of methane" means a mixture wherein 80% or more of the hydrocarbons contained in the mixture are methane. Examples of such a gaseous mixture include various town gases.

There is no particular limitation on the concentration of the hydrocarbon added to the exhaust gas, and the hydrocarbon may be added such that the content thereof is about 50 ppm to 1%, based on the entire exhaust gas. Although the amount of addition of the hydrocarbon may be further increased, the profitability and the percentage of hydrocarbon conversion are unfavorably reduced.

EXAMPLES

The present invention will now be described in more detail with reference to the following Examples, but is in no way limited to these Examples.

Example 1

Preparation of Catalyst 1

A 200 g amount of an $NH_4$ type ZSM-5 having a silica/alumina ratio of 40 was charged to 1800 ml of a 0.25M aqueous manganese acetate solution, and the mixture was stirred at 80° C. for 20 hr to effect the ion-exchange. After the mixture was subjected to solid-liquid separation, the zeolite cake was charged again to an aqueous solution having the same composition as that of the above-mentioned aqueous solution, to again conduct an ion exchange procedure. The mixture was then subjected to solid-liquid separation, and the solid was washed with 20 liters of pure water and dried at 110° C. for 10 hr, to give a catalyst 1. As a result of an elementary analysis of the catalyst 1, it was found that the manganese content was 1.02 times based on the alumina content.

Example 2

Preparation of Catalyst 2

A catalyst 2 was prepared in the same manner as in Example 1, except that an aqueous manganese nitrate solution was used instead of the aqueous manganese acetate solution. As a result of an elementary analysis of the catalyst 2, it was found that the manganese content was 0.54 time based upon the alumina content.

Example 3

Preparation of Catalyst 3

A 200 g amount of an $NH_4$ type ZSM-5 having a silica/alumina ratio of 40 was charged to 1800 ml of a 1.09M aqueous barium chloride solution, and the mixture was stirred at 80° C. for 16 hr. After the mixture was subjected to solid-liquid separation, the solid was thoroughly washed with water, charged to 700 ml of a 0.23M aqueous manganese acetate solution, and stirred at 80° C. for 16 hr. The slurry was then subjected to solid-liquid separation, the zeolite cake was charged to a freshly prepared aqueous solution having the above-mentioned composition, and the above-mentioned procedure was repeated. The resultant slurry was subjected to solid-liquid separation, and the solid was thoroughly washed with water and dried at 110° C. for 10 hr, to give a catalyst 3. As a result of elementary analysis of the catalyst 3, it was found that the barium content and the manganese content were respectively 0.66 time and 0.87 time, based upon the alumina content.

Comparative Example 1

Preparation of Comparative Catalyst 1

A 1 kg amount of an $NH_4$ type ZSM-5 having a silica/alumina mole ratio of 40 was added to a 0.1M copper acetate solution so that the number of copper atoms was one time the number of Al atoms in the zeolite. Thereafter, a 2.5% aqueous ammonia was added thereto to adjust the pH value to 10.5, and the mixture was stirred at room temperature for 20 hr, to thereby conduct an ion exchange treatment. This procedure was repeated twice, and the resultant solid was washed and dried at 110° C. for 12 hr to give a comparative catalyst 1. As a result of a chemical analysis, the comparative catalyst 1 was found to have a $CuO/Al_2O_3$ mole ratio of 1.05.

Comparative Example 2

Preparation of Comparative Catalyst 2

A 20 g amount of an $NH_4$ type ZSM-5 having a silica/alumina ratio of 40 was charged to 180 ml of a 0.23M aqueous nickel acetate tetrahydrate solution, and the mixture was stirred at 80° C. for 16 hr. After the slurry was subjected to solid-liquid separation, the zeolite cake was charged to a freshly prepared aqueous solution having the above-mentioned composition, and the above-mentioned procedure was repeated. The slurry was subjected to solid-liquid separation, and the solid was thoroughly washed with water and dried at 110° C. for 10 hr, to give a comparative catalyst 2. The comparative catalyst 2 was subjected to chemical analysis and found to have an $NiO/Al_2O_3$ mole ratio of 1.40.

Example 4

(Evaluation Test 1 of Catalyst)

Catalysts 1 to 3 and comparative catalysts 1 to 2 were press-molded and then crushed to regulate the size of granules thereof to 12 to 20 mesh, and an atmospheric fixed bed type reaction tube was packed with 1.2 g of each of the granular catalysts. The fixed bed was pretreated at 500° C. for one hour, while passing air through the reaction tube, and thereafter, a gas (hereinafter referred to as "reaction gas") having the composition shown in Table 1 was passed through the reaction tube at a flow rate of 500 ml/min, to thereby determine the catalytic activities at 400° C. and 500° C., respectively. The $NO_x$ and methane conversions at the respective temperatures after the state had become steady are given in Table 2. In all of the shown catalysts, the conversions of CO, and of the hydrocarbons except for methane, were substantially 100%. The $NO_x$ conversion can be determined by the following equation; the methane conversion was similarly determined.

$$NO_x \text{ conversion} (\%) = (NO_{xin} - NO_{xout}/NO_{xin}) \times 100$$

wherein $NO_{xin}$: $NO_x$ concentration at inlet of reaction tube; and $NO_{xout}$: $NO_x$ concentration at outlet of reaction tube.

TABLE 1

| Composition of Reaction Gas | |
|---|---|
| NO | 600 ppm |
| CO | 500 ppm |
| $CH_4$ | 2920 ppm |
| $C_2H_6$ | 160 ppm |
| $C_3H_8$ | 121 ppm |
| n-$C_4H_{10}$ | 33 ppm |
| i-$C_4H_{10}$ | 14 ppm |
| $CO_2$ | 7% |
| $O_2$ | 5% |
| $H_2O$ | 15% |
| $N_2$ | balance |

TABLE 2

Results of Evaluation Test 1 of Catalyst

| | | 400° C. | | 500° C. | |
|---|---|---|---|---|---|
| | | $NO_x$ | $CH_4$ | $NO_x$ | $CH_4$ |
| Catalyst 1 | Mn | 28 | 3 | 35 | 45 |
| Catalyst 2 | Mn | 30 | 5 | 33 | 41 |
| Catalyst 3 | Mn + Ba | 24 | 3 | 27 | 30 |
| Comparative Catalyst 1 | Cu | 16 | 13 | 12 | 75 |
| Comparative Catalyst 2 | Ni | 9 | 0 | 13 | 5 |

Example 5

(Evaluation Test 2 of Catalyst)

The catalytic activity was measured in the same manner as in Example 4, except that a hydrocarbon mixed gas composed mainly of methane as shown in Table 4 was added in an amount of 5000 ppm to the reaction gas shown in Table 3. The $NO_x$ and methane conversions at respective temperatures after the state had become steady are given in Table 5. In all of the shown catalysts, the conversions of CO, and of the hydrocarbons except for methane, were substantially 100%.

TABLE 3

| Composition of Reaction Gas | |
|---|---|
| NO | 600 ppm |
| CO | 500 ppm |
| $CH_4$ | 500 ppm |
| $CO_2$ | 7% |
| $O_2$ | 5% |
| $H_2O$ | 15% |
| $N_2$ | balance |

TABLE 4

| Composition of Mixed Gas | |
|---|---|
| $CH_4$ | 88.0% |
| $C_2H_6$ | 5.8% |
| $C_3H_8$ | 4.4% |
| $n-C_4H_{10}$ | 1.2% |
| $i-C_4H_{10}$ | 0.5% |

TABLE 5

| Results of Evaluation Test 2 of Catalyst | | | | | |
|---|---|---|---|---|---|
| | | 400° C. | | 500° C. | |
| | | $NO_x$ | $CH_4$ | $NO_x$ | $CH_4$ |
| Catalyst 1 | Mn | 42 | 2 | 57 | 35 |
| Catalyst 2 | Mn | 38 | 2 | 46 | 35 |
| Catalyst 3 | Mn + Ba | 30 | 3 | 38 | 25 |
| Comparative Catalyst 1 | Cu | 18 | 10 | 20 | 80 |
| Comparative Catalyst 2 | Ni | 11 | 0 | 20 | 0 |

Comparative Example 3

(Evaluation Test 3 of Catalyst)

The catalytic activity was measured in the same manner as in Example 4, except that a reaction gas specified in Table 3 was used as such as the reaction gas. The $NO_x$ and methane conversions at respective temperatures after the state had become steady are given in Table 6. In all of the shown catalysts, the conversion of CO was substantially 100%.

TABLE 6

| Results of Evaluation Test 3 of Catalyst | | | | | |
|---|---|---|---|---|---|
| | | 400° C. | | 500° C. | |
| | | $NO_x$ | $CH_4$ | $NO_x$ | $CH_4$ |
| Catalyst 1 | Mn | 16 | 5 | 13 | 25 |
| Catalyst 2 | Mn | 18 | 6 | 16 | 32 |
| Catalyst 3 | Mn + Ba | 17 | 8 | 15 | 30 |
| Comparative Catalyst 1 | Cu | 15 | 15 | 8 | 100 |
| Comparative Catalyst 2 | Ni | 7 | 0 | 11 | 10 |

Example 6

(Evaluation Test 4 of Catalyst)

The catalytic activity was measured in the same manner as in Example 4, except that a reaction gas was changed as shown in Table 7. The $NO_x$ conversions at respective temperatures after the state had become steady are given in Table 8. In all of the catalysts shown, the conversions of CO and propane were substantially 100%.

TABLE 7

| Composition of Reaction Gas | |
|---|---|
| NO | 1000 ppm |
| CO | 500 ppm |
| $C_3H_8$ | 500 ppm |
| $CO_2$ | 10% |
| $O_2$ | 5% |
| $H_2O$ | 10% |
| $N_2$ | balance |

TABLE 8

| Results of Evaluation Test 4 of Catalyst | | | |
|---|---|---|---|
| | | $NO_x$ Conversion, % | |
| | | 400° C. | 500° C. |
| Catalyst 1 | Mn | 47 | 46 |
| Catalyst 2 | Mn | 48 | 49 |
| Catalyst 3 | Mn + Ba | 42 | 46 |
| Comparative Catalyst 1 | Cu | 26 | 22 |
| Comparative Catalyst 2 | Ni | 8 | 15 |

Example 7

(Evaluation Test 5 of Catalyst)

The catalytic activity was measured in the same manner as in Example 4, except that the reaction gas was changed as shown in Table 9 and the catalyst was used in an amount of 2.5 g. The $NO_x$ conversions at respective temperatures after the state had become steady are given in Table 10. In all of the catalysts shown, the conversions of CO and propylene were substantially 100%.

TABLE 9

| Composition of Reaction Gas | |
|---|---|
| NO | 500 ppm |
| CO | 500 ppm |
| $C_3H_6$ | 500 ppm |
| $CO_2$ | 10% |
| $O_2$ | 5% |
| $H_2O$ | 10% |
| $N_2$ | balance |

TABLE 10

| Results of Evaluation Test 5 of Catalyst | | | |
|---|---|---|---|
| | | $NO_x$ Conversion, % | |
| | | 400° C. | 500° C. |
| Catalyst 1 | Mn | 72 | 74 |
| Catalyst 2 | Mn | 75 | 78 |
| Catalyst 3 | Mn + Ba | 76 | 75 |

Comparative Example 4

(Preparation of Comparative Catalyst 3)

A 200 g amount of an $NH_4$ type ZSM-5 having a silica/alumina ratio of 40 was charged to 1800 ml of a 0.25M aqueous $Co(CH_3COO)_2 \cdot 4H_2O$ solution, and the mixture was stirred at 80° C. for 20 hr to conduct an ion exchange. The slurry was then subjected to solid-liquid separation, and thereafter, the zeolite cake was charged again to an aqueous solution having the same composition as that of the above-mentioned aqueous solution, to again effect an ion exchange procedure. The mixture was subjected to solid-liquid separation, and the solid was washed with 20 liters of pure water and dried at 110° C. for 10 hr, to give a comparative catalyst 3. As a result of an elementary analysis of the catalyst, it was found that the cobalt content was 1.39 times, based upon the alumina content.

Example 8

(Preparation of Catalyst 4)

A 20 g amount of the comparative catalyst 3 was charged to 100 cc an aqueous solution containing $[Pd(NH_3)_4]Cl_2 \cdot H_2O$ in an amount of 0.05 time by mole based upon alumina in the zeolite, and the mixture was dried at 80° C. under a reduced pressure to support Pd on the zeolite and then dried at 110° C. for 10 hr to give a catalyst 4. As a result of an elementary analysis of the catalyst, it was found that the cobalt content and the palladium content were respectively 1.39 times and 0.05 time, based upon the alumina content.

Example 9

(Preparation of Catalyst 5)

A catalyst 5 was prepared in the same manner as in Example 8, except that the amount of $[Pd(NH_3)_4]Cl_2 \cdot H_2O$ was 0.1 time by mole based upon alumina in the zeolite. As a result of an elementary analysis of the catalyst, it was found that the cobalt content and the palladium content were respectively 1.39 times and 0.1 time, based upon the alumina content.

Example 10

(Preparation of Catalyst 6)

A catalyst 6 was prepared in the same manner as in Example 8, except that the amount of $[Pd(NH_3)_4]Cl_2 \cdot H_2O$ was 0.2 time by mole, based upon alumina in the zeolite. As a result of an elementary analysis of the catalyst, it was found that the cobalt content and the palladium content were respectively 1.39 times and 0.2 time, based upon the alumina content.

Comparative Example 5

(Preparation of Comparative Catalyst 4)

A 20 g amount of an $NH_4$ type ZSM-5 having a silica/alumina ratio of 40 was charged to 180 ml of an aqueous solution containing $[Pd(NH_3)_4]Cl_2 \cdot H_2O$ in an amount of 0.1 time by mole, based upon that of alumina in the zeolite, and the mixture was stirred at 80° C. for 16 hr. The resultant slurry was subjected to solid-liquid separation, and the solid was thoroughly washed with water and dried at 110° C. for 10 hr to give a comparative catalyst 4. This catalyst was subjected to chemical analysis and found to have a $PdO/Al_2O_3$ mole ratio of 0.1.

Example 11

(Evaluation Test 6 of Catalyst)

The catalysts 4 to 6 and the comparative catalysts 1 to 4 were subjected to a measurement of the catalytic activity thereof in the same manner as in Example 4. The $NO_x$ and methane conversions at respective temperatures after the state had become steady are given in Table 11. In all of the catalysts shown, the conversion of CO was substantially 100%.

TABLE 11

Results of Evaluation Test 6 of Catalyst

|  |  | 400° C. | | 500° C. | |
| --- | --- | --- | --- | --- | --- |
|  |  | $NO_x$ | $CH_4$ | $NO_x$ | $CH_4$ |
| Catalyst 4 | Co + Pd (0.05) | 42 | 18 | 63 | 65 |
| Catalyst 5 | Co + Pd (0.1) | 70 | 20 | 76 | 73 |
| Catalyst 6 | Co + Pd (0.2) | 56 | 23 | 70 | 80 |
| Comparative Catalyst 1 | Cu | 16 | 13 | 12 | 75 |
| Comparative Catalyst 2 | Ni | 9 | 0 | 13 | 5 |
| Comparative Catalyst 3 | Co | 24 | 5 | 26 | 25 |
| Comparative Catalyst 4 | Pd | 0 | 22 | 2 | 100 |

Example 12

(Evaluation Test 7 of Catalyst)

The catalysts 4 to 6 and the comparative catalysts 1 to 4 were subjected to a measurement of the catalytic activity in the same manner as in Example 4, except that the reaction gas was changed as shown in Table 3. The $NO_x$ and methane conversions at respective temperatures after the state had become steady are given in Table 12. In all of the catalysts shown, the conversions of CO, and of the hydrocarbons except for methane, were substantially 100%.

TABLE 12

Results of Evaluation Test 7 of Catalyst

|  |  | 400° C. | | 500° C. | |
| --- | --- | --- | --- | --- | --- |
|  |  | $NO_x$ | $CH_4$ | $NO_x$ | $CH_4$ |
| Catalyst 4 | Co + Pd (0.05) | 16 | 18 | 20 | 100 |
| Catalyst 5 | Co + Pd (0.1) | 17 | 20 | 22 | 100 |
| Catalyst 6 | Co + Pd (0.2) | 16 | 20 | 22 | 100 |
| Comparative Catalyst 1 | Cu | 15 | 15 | 8 | 100 |
| Comparative Catalyst 2 | Ni | 7 | 0 | 11 | 10 |
| Comparative Catalyst 3 | Co | 2 | 18 | 10 | 100 |
| Comparative Catalyst 4 | Pd | 0 | 20 | 1 | 100 |

Example 13

(Evaluation Test 8 of Catalyst)

The catalytic activity was measured in the same manner as in Example 5, except that methane was further added in an amount of 5000 ppm to the reaction gas shown in Table 3. The $NO_x$ and methane conversions at respective temperatures after the state had become steady are given in Table 13. In all of the catalysts shown, the conversion of CO was substantially 100%.

TABLE 13

Results of Evaluation Test 8 of Catalyst

|  |  | 400° C. | | 500° C. | |
| --- | --- | --- | --- | --- | --- |
|  |  | $NO_x$ | $CH_4$ | $NO_x$ | $CH_4$ |
| Catalyst 4 | Co + Pd (0.05) | 45 | 13 | 78 | 73 |
| Catalyst 5 | Co + Pd (0.1) | 65 | 15 | 95 | 80 |
| Catalyst 6 | Co + Pd (0.2) | 61 | 16 | 82 | 84 |
| Comparative Catalyst 1 | Cu | 7 | 5 | 10 | 80 |
| Comparative Catalyst 2 | Ni | 8 | 0 | 12 | 5 |

TABLE 13-continued

Results of Evaluation Test 8 of Catalyst

|  |  | 400° C. | | 500° C. | |
| --- | --- | --- | --- | --- | --- |
|  |  | $NO_x$ | $CH_4$ | $NO_x$ | $CH_4$ |
| Comparative Catalyst 3 | Co | 14 | 1 | 34 | 30 |
| Comparative Catalyst 4 | Pd | 0 | 19 | 1 | 81 |

Example 14

(Evaluation Test 9 of Catalyst)

The catalysts 4 to 6 and the comparative catalysts 1 to 4 were subjected to a measurement of the catalytic activity in the same manner as in Example 5. The $NO_x$ and methane conversions at respective temperatures after the state had become steady are given in Table 14. In of all the catalysts shown, the conversions of CO, and of the hydrocarbons except for methane, were substantially 100%.

TABLE 14

Results of Evaluation Test 9 of Catalyst

|  |  | 400° C. | | 500° C. | |
| --- | --- | --- | --- | --- | --- |
|  |  | $NO_x$ | $CH_4$ | $NO_x$ | $CH_4$ |
| Catalyst 4 | Co + Pd (0.05) | 60 | 5 | 76 | 60 |
| Catalyst 5 | Co + Pd (0.1) | 85 | 5 | 96 | 72 |
| Catalyst 6 | Co + Pd (0.2) | 80 | 5 | 92 | 82 |
| Comparative Catalyst 1 | Cu | 18 | 10 | 20 | 80 |
| Comparative Catalyst 2 | Ni | 11 | 0 | 20 | 0 |
| Comparative Catalyst 3 | Co | 48 | 2 | 50 | 35 |
| Comparative Catalyst 4 | Pd | 0 | 5 | 1 | 75 |

Example 15

(Evaluation Test 10 of Catalyst)

The catalysts 4 to 6 and the comparative catalysts 1 to 4 were subjected to a measurement of the catalytic activity in the same manner as in Example 5, except that propane was further added in an amount of 500 ppm to the reaction gas shown in Table 3. The $NO_x$ and methane conversions at respective temperatures after the state had become steady are given in Table 15.

TABLE 15

Results of Evaluation Test 10 of Catalyst

|  |  | 400° C. | | 500° C. | |
| --- | --- | --- | --- | --- | --- |
|  |  | $NO_x$ | $CH_4$ | $NO_x$ | $CH_4$ |
| Catalyst 4 | Co + Pd (0.05) | 63 | 20 | 72 | 100 |
| Catalyst 5 | Co + Pd (0.1) | 82 | 22 | 86 | 100 |
| Catalyst 6 | Co + Pd (0.2) | 78 | 23 | 82 | 100 |
| Comparative Catalyst 1 | Cu | 24 | 4 | 18 | 70 |
| Comparative Catalyst 2 | Ni | 13 | 0 | 20 | 0 |
| Comparative Catalyst 3 | Co | 60 | 9 | 50 | 31 |
| Comparative Catalyst 4 | Pd | 0 | 21 | 2 | 100 |

Example 16

(Evaluation Test 11 of Catalyst)

The catalysts 4 to 6 and the comparative catalysts 1 to 4 were subjected to a measurement of the catalytic activity in the same manner as in Example 6.

The $NO_x$ conversions at respective temperatures after the state had become steady are given in Table 16. In all of the catalysts shown, the conversions of CO and propane were substantially 100%.

TABLE 16

Results of Evaluation Test 11 of Catalyst

|  |  | $NO_x$ Conversion, % | |
| --- | --- | --- | --- |
|  |  | 400° C. | 500° C. |
| Catalyst 4 | Co + Pd (0.05) | 57 | 66 |
| Catalyst 5 | Co + Pd (0.1) | 78 | 79 |
| Catalyst 6 | Co + Pd (0.2) | 75 | 76 |
| Comparative Catalyst 1 | Cu | 26 | 22 |
| Comparative Catalyst 2 | Ni | 8 | 15 |
| Comparative Catalyst 3 | Co | 41 | 43 |
| Comparative Catalyst 4 | Pd | 0 | 2 |

Example 17

(Evaluation Test 12 of Catalyst)

A 5 g amount of each of the catalysts 4 to 6 was subjected to a measurement of the catalytic activity in the same manner as in Example 7.

The $NO_x$ conversions at respective temperatures after the state had become steady are given in Table 17. In all of the catalysts shown, the conversions of CO and propylene were substantially 100%.

TABLE 17

Results of Evaluation Test 12 of Catalyst

|  |  | $NO_x$ Conversion, % | |
| --- | --- | --- | --- |
|  |  | 400° C. | 500° C. |
| Catalyst 4 | Co + Pd (0.05) | 67 | 56 |
| Catalyst 5 | Co + Pd (0.1) | 76 | 69 |
| Catalyst 6 | Co + Pd (0.2) | 73 | 66 |

Example 18

(Preparation of Catalyst 7)

A 20 g amount of the Comparative catalyst 3 was charged to 100 cc of an aqueous solution containing $AgNO_3$ in an amount of 0.1 time by mole, based upon that of alumina in the zeolite, and the mixture was dried at 80° C. under a reduced pressure to support Ag on the zeolite, and then dried at 110° C. for 10 hr to give a catalyst 7. As a result of an elementary analysis of the catalyst, it was found that the cobalt content and the silver content were respectively 1.39 times and 0.1 time, based upon the alumina content.

Example 19

(Preparation of Catalyst 18)

A catalyst 8 was prepared in the same manner as in Example 8, except that the amount of $AgNO_3$ was 2.0 times by mole, based upon that of alumina in the zeolite. This catalyst was subjected to an elementary analysis, and as a result, it was found that the cobalt content and the silver content were respectively 1.39 times and 2.0 times, based upon the alumina content.

Example 20

(Preparation of Catalyst 9)

A catalyst 9 was prepared in the same manner as in Example 18, except that the amount of $AgNO_3$ was 3.0 times by mole, based upon that of alumina in the zeolite. As a result of an elementary analysis, it was found that the cobalt content and the silver content were respectively 1.39 times and 3.0 times, based upon the alumina content.

Comparative Example 6

(Preparation of Comparative Catalyst.5)

A 20 g amount of a Na type ZSM-5 having a silica/alumina ratio of 40 was charged to 180 ml of an aqueous solution containing $AgNo_3$ in an amount of 0.5 times by mole, based upon alumina in the zeolite, and the mixture was stirred at 80° C. for 16 hr. The resultant slurry was subjected to solid-liquid separation, and the solid was thoroughly washed with water and dried at 110° C. 10 for 10 hr, to give a comparative catalyst 4. This catalyst was subjected to chemical analysis and found to have a $Ag_2O/Al_2O_3$ mole ratio of 0.39 and a $Na_2O/Al_2O_3$ mole ratio of 0.62.

Example 21

(Evaluation Test 13 of Catalyst)

The catalysts 7 to 9 and the comparative catalysts 1 to 3 and 5 were subjected to a measurement of the catalytic activity in the same manner as in Example 4.

The $NO_x$ and methane conversions at respective temperatures after the state had become steady are given in Table 18. In all of the catalysts shown, the conversion of CO, and of the hydrocarbons except for methane, was substantially 100%.

TABLE 18

| Results of Evaluation Test 13 of Catalyst | | 400° C. | | 500° C. | |
|---|---|---|---|---|---|
| | | $NO_x$ | $CH_4$ | $NO_x$ | $CH_4$ |
| Catalyst 7 | Co + Pd (0.05) | 41 | 10 | 56 | 63 |
| Catalyst 8 | Co + Ag (2.0) | 52 | 10 | 70 | 72 |
| Catalyst 9 | Co + Ag (3.0) | 54 | 15 | 68 | 83 |
| Comparative Catalyst 1 | Cu | 16 | 13 | 12 | 75 |
| Comparative Catalyst 2 | Ni | 9 | 0 | 13 | 5 |
| Comparative Catalyst 3 | Co | 24 | 5 | 26 | 25 |
| Comparative Catalyst 5 | Ag | 15 | 12 | 12 | 70 |

Example 22

(Evaluation Test 14 of Catalyst)

The catalytic activity was measured through the use of a reaction gas shown in Table 3, in the same manner as in Example 21.

The $NO_x$ and methane conversions at respective temperatures after the state had become steady are given in Table 19. In all of the catalysts shown, the conversions of CO was substantially 100%.

TABLE 19

| Results of Evaluation Test 14 of Catalyst | | 400° C. | | 500° C. | |
|---|---|---|---|---|---|
| | | $NO_x$ | $CH_4$ | $NO_x$ | $CH_4$ |
| Catalyst 7 | Co + Pd (0.05) | 18 | 19 | 18 | 70 |
| Catalyst 8 | Co + Ag (2.0) | 20 | 21 | 19 | 80 |
| Catalyst 9 | Co + Ag (3.0) | 19 | 22 | 20 | 100 |
| Comparative Catalyst 1 | Cu | 15 | 15 | 8 | 100 |
| Comparative Catalyst 2 | Ni | 7 | 0 | 11 | 10 |
| Comparative Catalyst 3 | Co | 2 | 18 | 10 | 100 |
| Comparative Catalyst 5 | Ag | 8 | 20 | 10 | 80 |

Example 23

(Evaluation 15 of Catalyst)

The catalysts 7 to 9 and the comparative catalysts 1 to 3 and 5 were subjected to a measurement of the catalytic activity in the same manner as in Example 5.

The $NO_x$ and methane conversions at respective temperatures after the state had become steady are given in Table 20. In all of the catalysts shown, the conversions of CO, and of the hydrocarbons other than methane, was substantially 100%.

TABLE 20

| Results of Evaluation Test 15 of Catalyst | | 400° C. | | 500° C. | |
|---|---|---|---|---|---|
| | | $NO_x$ | $CH_4$ | $NO_x$ | $CH_4$ |
| Catalyst 7 | Co + Pd (0.05) | 18 | 19 | 18 | 70 |
| Catalyst 8 | Co + Ag (2.0) | 63 | 9 | 77 | 52 |
| Catalyst 9 | Co + Ag (3.0) | 62 | 15 | 65 | 72 |
| Comparative Catalyst 1 | Cu | 18 | 10 | 20 | 80 |
| Comparative Catalyst 2 | Ni | 11 | 0 | 20 | 0 |
| Comparative Catalyst 3 | Co | 48 | 2 | 50 | 35 |
| Comparative Catalyst 5 | Ag | 25 | 1 | 27 | 5 |

Example 24

(Evaluation Test 16 of Catalyst)

The catalysts 7 to 9 and the comparative catalysts 1 to 3 and 5 were subjected to a measurement of the catalytic activity in the same manner as in Example 6.

The $NO_x$ conversions at respective temperatures after the state had become steady are given in Table 21. In all of the catalysts shown, the conversions of CO and propane were substantially 100%.

TABLE 21

| Results of Evaluation Test 16 of Catalyst | | $NO_x$ Conversion, % | |
|---|---|---|---|
| | | 400° C. | 500° C. |
| Catalyst 7 | Co + Ag (0.1) | 53 | 56 |
| Catalyst 8 | Co + Ag (2.0) | 60 | 73 |
| Catalyst 9 | Co + Ag (3.0) | 61 | 63 |
| Comparative Catalyst 1 | Cu | 26 | 22 |
| Comparative Catalyst 2 | Ni | 8 | 15 |
| Comparative Catalyst 3 | Co | 41 | 43 |
| Comparative | Ag | 0 | 2 |

TABLE 21-continued

Results of Evaluation Test 16 of Catalyst

|  | $NO_x$ Conversion, % | |
|---|---|---|
|  | 400° C. | 500° C. |
| Catalyst 4 | | |

Example 25

(Evaluation Test 17 of Catalyst)

The catalysts 7 to 9 were subjected to a measurement of the catalytic activity in the same manner as in Example 7. The $NO_x$ conversions at respective temperatures after the state had become steady are given in Table 22. In all of the catalysts shown, the conversions of CO and propylene were substantially 100%.

TABLE 22

Results of Evaluation Test 17 of Catalyst

|  |  | $NO_x$ Conversion, % | |
|---|---|---|---|
|  |  | 400° C. | 500° C. |
| Catalyst 7 | Co + Ag (0.1) | 72 | 67 |
| Catalyst 8 | Co + Ag (2.0) | 81 | 77 |
| Catalyst 9 | Co + Ag (3.0) | 79 | 78 |

As apparent from the above-mentioned catalyst, evaluation results, the zeolite catalysts of the present invention can efficiently remove nitrogen oxides, carbon monoxide and hydrocarbons from an oxygen-rich exhaust gas containing nitrogen oxides, carbon monoxide and hydrocarbons. Further, even when the major component of the hydrocarbons contained in the exhaust gas is a hydrocarbon having one carbon atom, the zeolite catalysts of the present invention can remove nitrogen oxides, carbon monoxide and hydrocarbons at a conversion rate higher than that attained by the comparative catalysts. Further, it is apparent that the nitrogen oxides can be removed at a very high conversion rate when the catalyst of the present invention is used, and at the same time, a hydrocarbon is further added to the exhaust gas, which renders the present invention very useful for environmental protection.

I claim:

1. A method of purifying an internal combustion engine oxygen rich exhaust gas by removing nitrogen oxides, carbon monoxide, and hydrocarbons from the oxygen rich exhaust gas containing the same, comprising a step of bringing a catalyst into contact with the exhaust gas, said catalyst comprising a zeolite having one of
   (i) cobalt and palladium, or
   (ii) cobalt and silver contained therein.

2. A method as claimed in claim 1, wherein a hydrocarbon having one carbon atom is a main component of the hydrocarbons.

3. A method as claimed in claim 1, wherein at least one hydrocarbon is further added to the oxygen rich exhaust gas.

4. A method as claimed in claim 3, wherein the hydrocarbon added is methane or a mixture containing methane as a main component.

5. A method as claimed in claim 3, wherein the hydrocarbon is added such that the content thereof is about 50 ppm to 1%, based on the entire exhaust gas.

6. A method as claimed in claim 1, wherein said zeolite is a crystalline aluminosilicate which contains one of
   (i) cobalt and palladium, or
   (ii) cobalt and silver,
   wherein cobalt and palladium or cobalt and silver have been incorporated into said zeolite by ion exchange or by impregnation.

7. A method as claimed in claim 6, wherein said zeolite contains cobalt and palladium, wherein the molar ratio of $CoO/Al_2O_3$ is 0.25 to 2.0 and wherein the molar ratio of $PdO/Al_2O_3$ is 0.05 to 0.8.

8. A method as claimed in claim 6, wherein said zeolite contains cobalt and silver, wherein the molar ratio of $CoO/Al_2O_3$ is 0.6 to 1.45 and wherein the molar ratio of $Ag_2O/Al_2O_3$ is 0.05 to 4.0.

9. A method as claimed in claim 6, wherein said zeolite contains cobalt and palladium, wherein the molar ratio of $CoO/Al_2O_3$ is 0.2 to 2.5 and the molar ratio of $PdO/Al_2O_3$ is 0.01 to 1.0.

10. A method as claimed in claim 6, wherein said zeolite contains cobalt and silver, wherein the molar ratio of $CoO/Al_2O_3$ is 0.5 to 1.5 and the molar ratio of $Ag_2)/Al_2O_3$ is 0.01 to 5.0.

11. The method as claimed in claim 6, wherein said zeolite is a crystalline aluminosilicate which contains cobalt and silver,
    wherein cobalt and silver have been incorporated into said zeolite by ion exchange or by impregnation.

12. A method as claimed in claim 1, consisting of adding at least one hydrocarbon to an oxygen which exhaust gas containing nitrogen oxides, carbon monoxide and hydrocarbons and bringing a catalyst into contact with said exhaust gas, said catalyst comprising a zeolite having one of
    (i) cobalt and palladium, or
    (ii) cobalt and silver
    contained therein.

13. The method as claimed in claim 1, comprising a step of bringing a catalyst into contact with the exhaust gas, said catalyst comprising a zeolite having
    cobalt and silver
    contained therein.

* * * * *